US006496310B2

United States Patent
Fujimoto

(10) Patent No.: US 6,496,310 B2
(45) Date of Patent: Dec. 17, 2002

(54) OPTICAL SYSTEM AND OPTICAL APPARATUS PROVIDED WITH THE SAME

(75) Inventor: Makoto Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/001,038

(22) Filed: Nov. 15, 2001

(65) Prior Publication Data
US 2002/0126397 A1 Sep. 12, 2002

(30) Foreign Application Priority Data

Nov. 17, 2000 (JP) ......................................... 2000-351437

(51) Int. Cl.$^7$ ..................... G02B 15/14; G02B 3/08; G02B 9/00; G02B 5/18
(52) U.S. Cl. ..................... 359/680; 359/684; 359/654; 359/677; 359/740; 359/569; 359/566; 359/742
(58) Field of Search ..................... 359/654, 676, 359/677, 684, 680–682, 740, 742, 569, 566

(56) References Cited

U.S. PATENT DOCUMENTS

| | | | | |
|---|---|---|---|---|
| 5,151,823 A | * | 9/1992 | Chen | 359/565 |
| 5,543,966 A | | 8/1996 | Meyers | 359/565 |
| 5,623,365 A | * | 4/1997 | Kuba | 359/565 |
| 5,629,799 A | | 5/1997 | Maruyama et al. | 359/565 |
| 5,631,779 A | | 5/1997 | Kashima | 359/742 |
| 5,790,321 A | | 8/1998 | Goto | 359/742 |
| 5,841,586 A | * | 11/1998 | Nagaoka | 359/654 |
| 5,880,879 A | * | 3/1999 | Foo | 359/565 |
| 5,923,479 A | * | 7/1999 | Nagata | 359/740 |
| 5,940,214 A | * | 8/1999 | Suzuki et al. | 359/565 |
| 5,978,140 A | * | 11/1999 | Maruyama | 359/565 |
| 5,978,158 A | * | 11/1999 | Nagata | 359/740 |
| 5,982,942 A | | 11/1999 | Hosokawa | 382/266 |
| 5,999,327 A | * | 12/1999 | Nagaoka | 359/654 |
| 6,010,537 A | | 1/2000 | Konno et al. | 659/389 |
| 6,081,389 A | * | 6/2000 | Takayama et al. | 359/676 |
| 6,147,815 A | * | 11/2000 | Fujie | 359/569 |
| 6,191,889 B1 | * | 2/2001 | Maruyama | 359/565 |
| 6,266,191 B1 | * | 7/2001 | Abe | 359/565 |
| 6,344,935 B1 | * | 2/2002 | Maruyama | 359/719 |
| 6,366,405 B2 | * | 4/2002 | Abe | 359/565 |
| 2002/0003660 A1 | * | 1/2002 | Abe | 359/565 |
| 2002/0018305 A1 | * | 2/2002 | Kohno | 359/740 |
| 2002/0027712 A1 | * | 3/2002 | Soskind | 359/565 |

FOREIGN PATENT DOCUMENTS

| | | |
|---|---|---|
| EP | 0 895 099 A2 * | 3/1999 |
| JP | 5-134174 | 5/1993 |
| JP | 6-324262 | 11/1994 |
| JP | 6-331887 | 12/1994 |
| JP | 6-331898 | 12/1994 |
| JP | 6-347700 | 12/1994 |
| JP | 7-181376 | 7/1995 |
| JP | 7-248447 | 9/1995 |
| JP | 8-508116 | 8/1996 |
| JP | 10-11577 | 1/1998 |
| JP | 11-64728 | 3/1999 |
| JP | 2000-66092 | 3/2000 |
| WO | 95/18393 | 7/1995 |

OTHER PUBLICATIONS

Stone, Thomas and George, Nicholas, "Hybrid diffractive–refractive lenses and achromats," *Applied Optics*, vol. 27, No. 14, Jul. 15, 1998 pp. 2960–2971.

* cited by examiner

Primary Examiner—Evelyn A Lester
(74) Attorney, Agent, or Firm—Morgan & Finnegan LLP

(57) ABSTRACT

An optical system includes a diffractive optical element in which a phase given to incident light from an optical axis toward the peripheral part in the radial direction is not reversed in an effective area and an absolute value of optical power on the optical axis is made minimum. In the optical system, chromatic aberration of magnification of a high order is satisfactorily corrected and flare caused by additional diffraction light (unnecessary diffraction light) is suppressed to as minimum as possible while maintaining a high imaging performance up to peripheral part of a field angle.

14 Claims, 18 Drawing Sheets

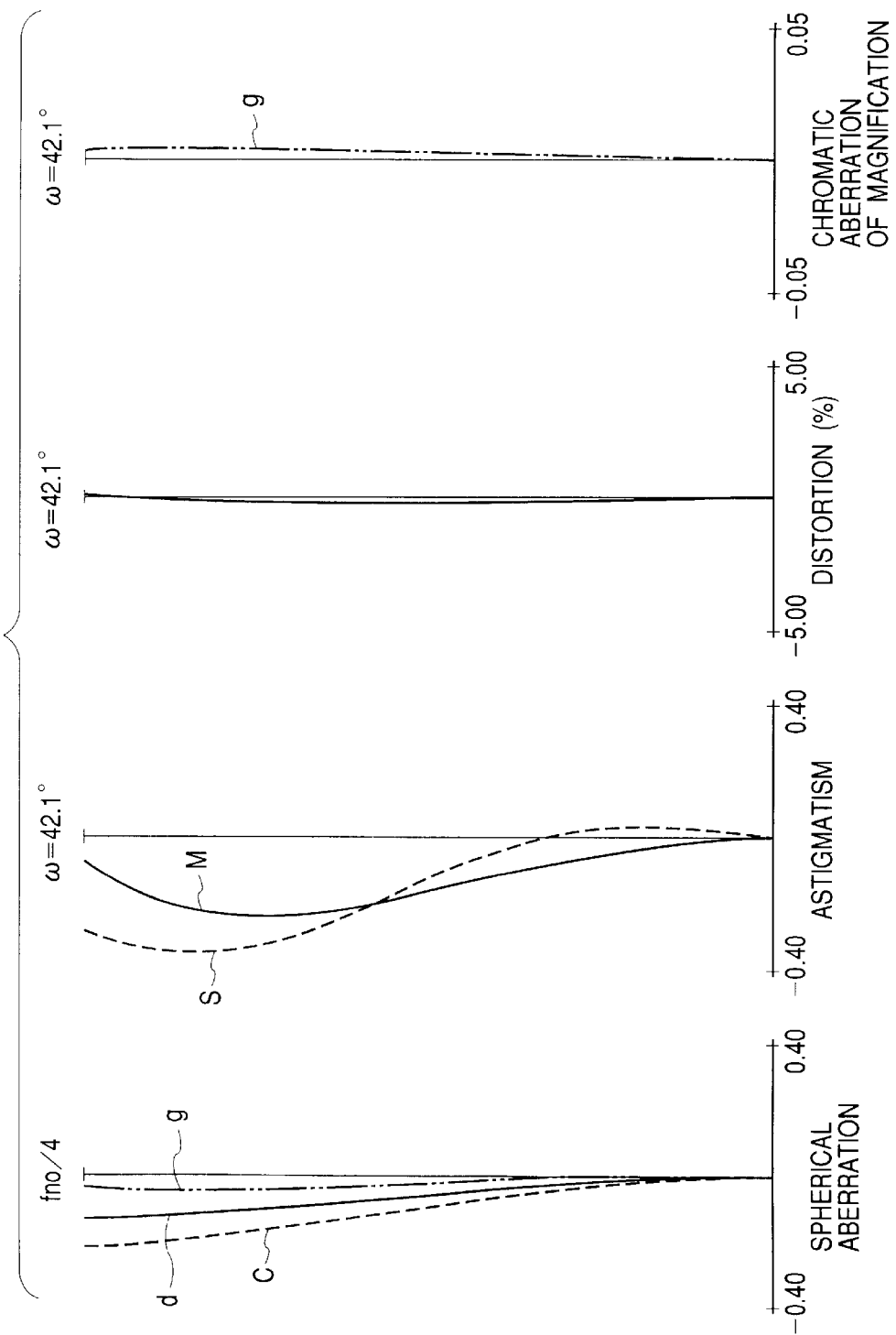

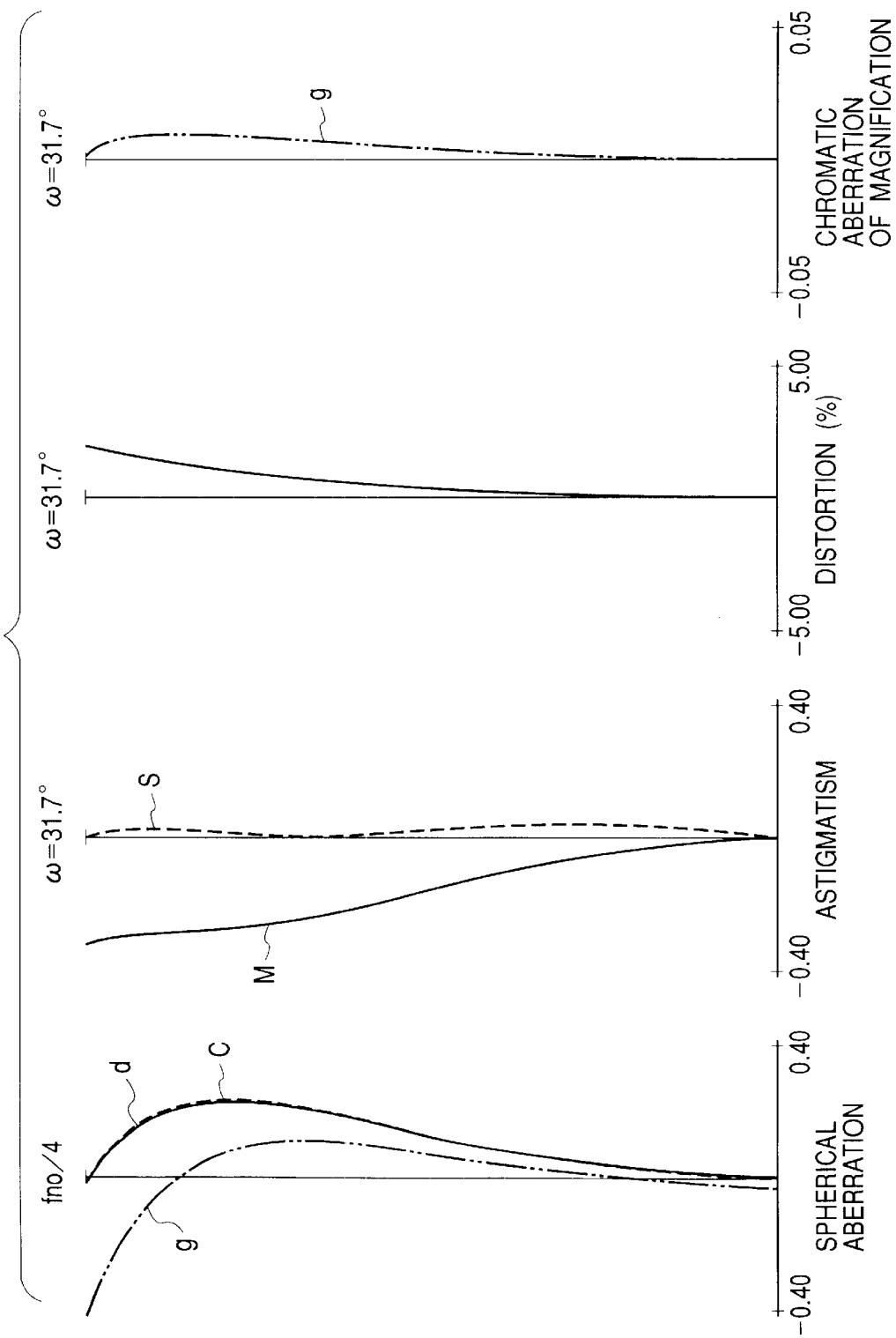

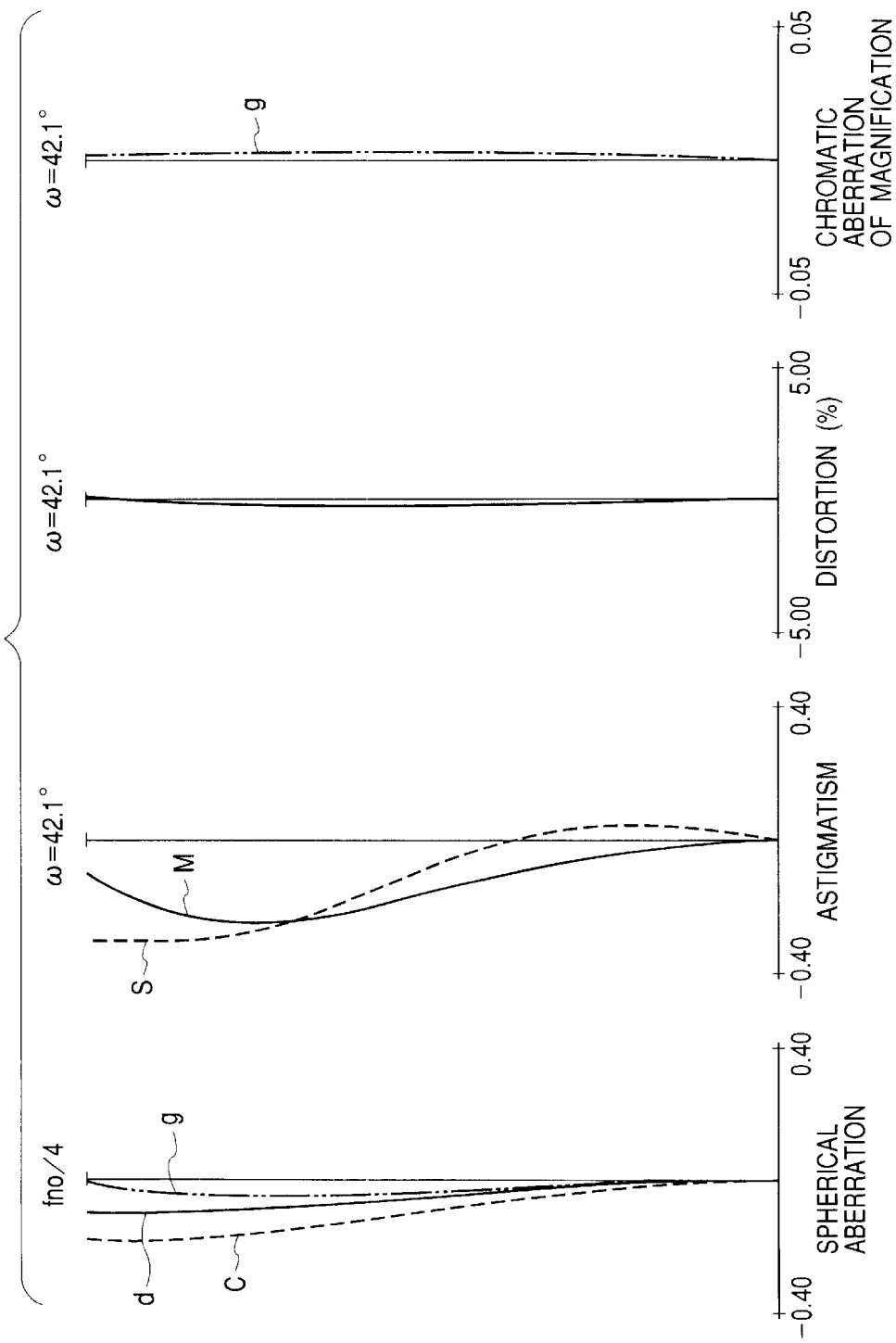

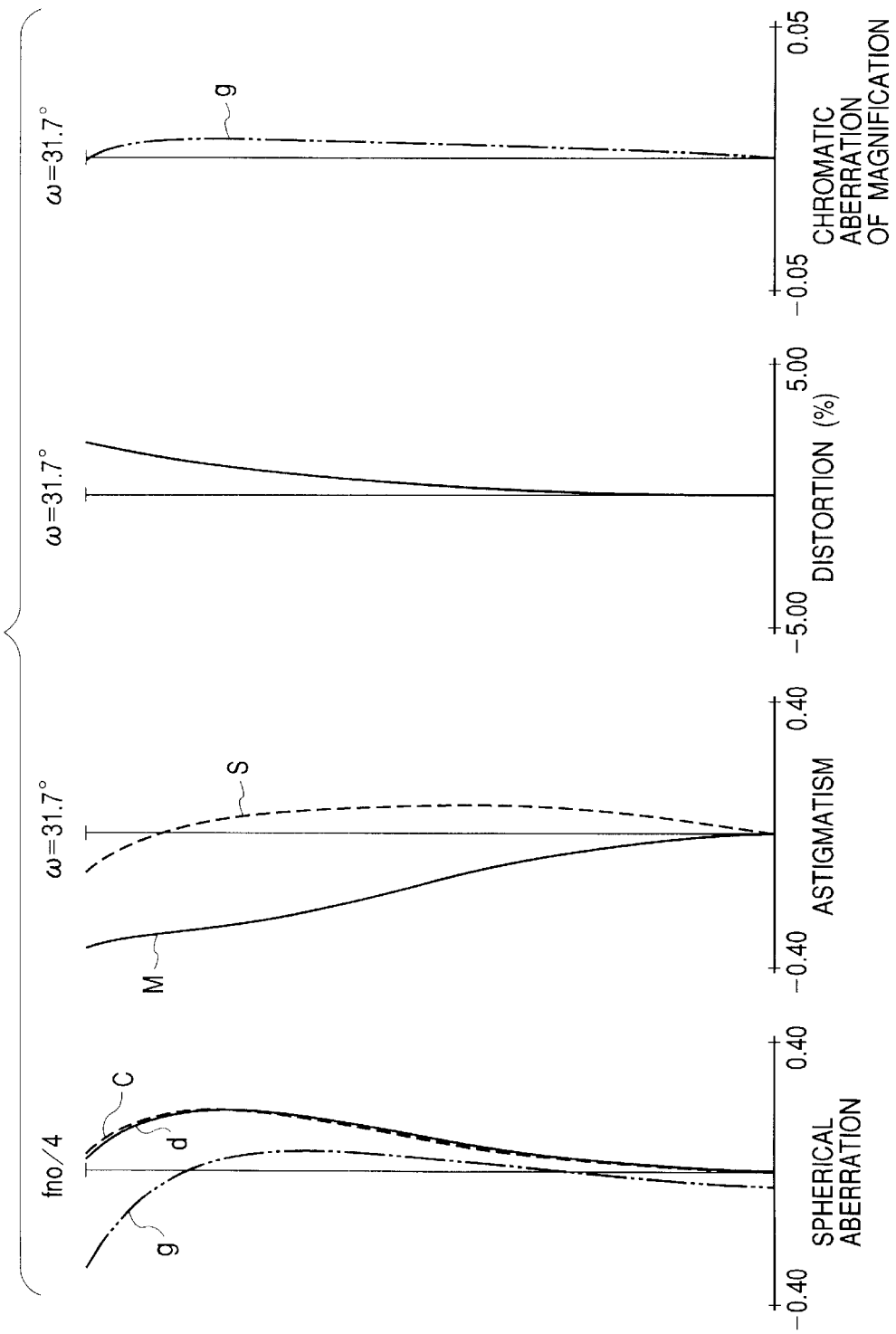

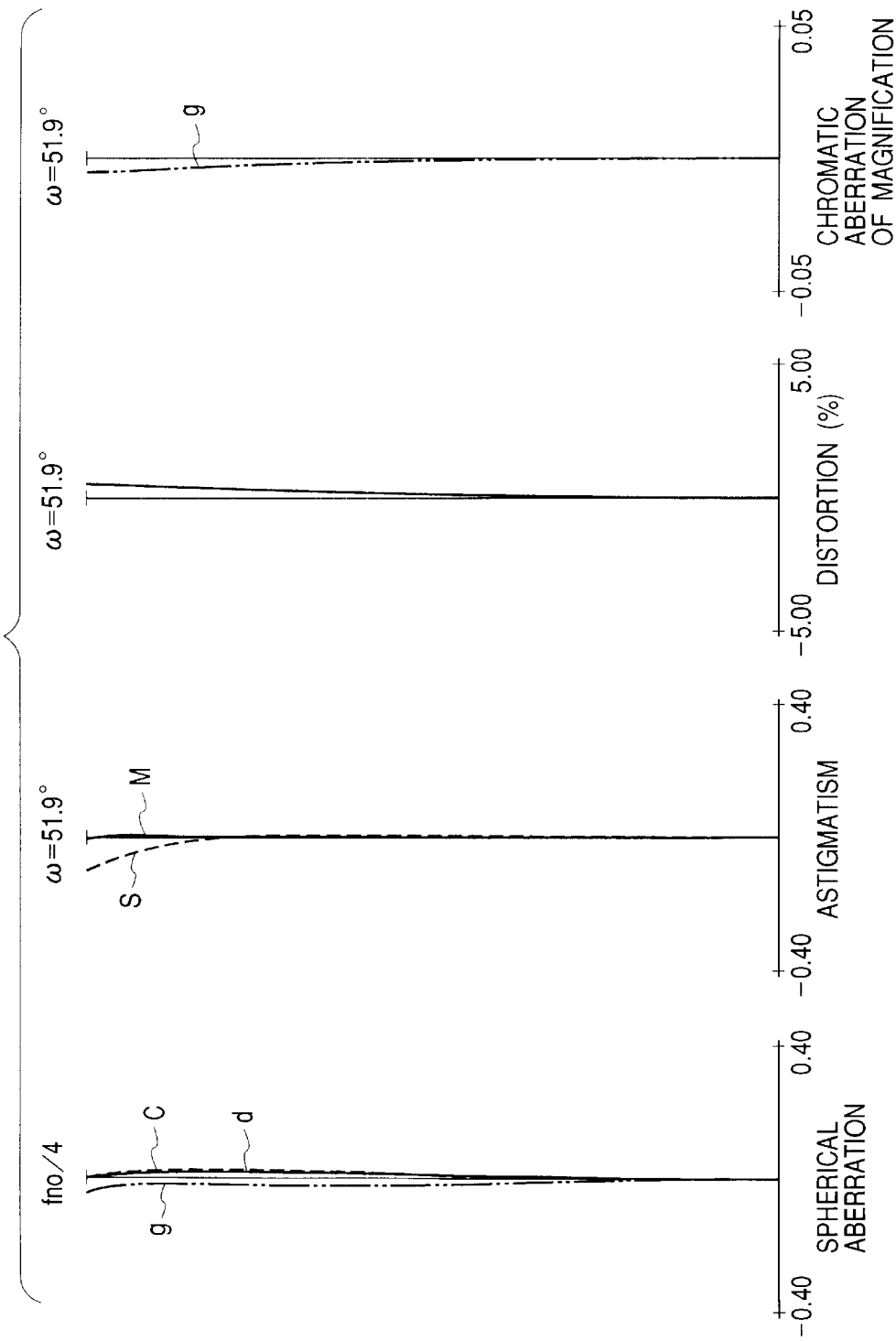

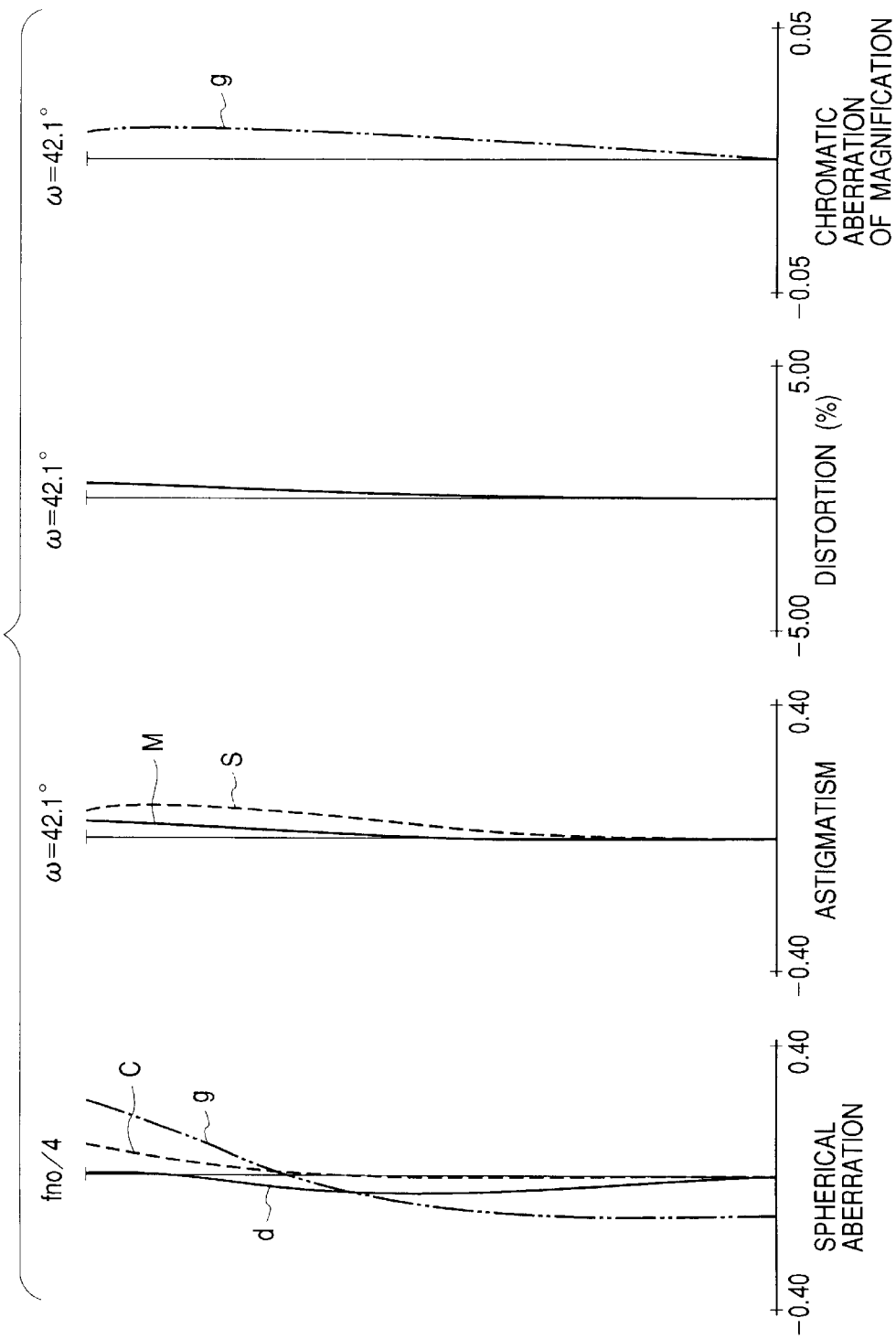

2.00 MM

OPTICAL SYSTEM AND OPTICAL APPARATUS PROVIDED WITH THE SAME

BACKGROUND OF THE INVENTION

1. Field of the Invention

The present invention relates to an optical system and an optical apparatus using the same, which are suitable for an optical apparatus such as a silver halide photographic camera, a video camera, an electronic still camera, a digital camera and a camera for reading an image (optical system for a copying machine), which satisfactorily maintain an imaging performance by combining a refractive optical element and a diffractive optical element.

In particular, the present invention is suited as a retrofocusing type image pick-up optical system with a long back focus, which satisfactorily maintains an imaging performance by combining a reflective optical element and a diffractive optical element.

2. Related Background Art

A solid image pick-up element used in an image pick-up apparatus in recent years has made progress in miniaturization with high definition by the development of manufacturing technology year by year. In the current state, a size of one pixel has been reduced to the order of several $\mu$m. Thus, an image pick-up lens of a higher performance is required for an optical system used in the image pick-up apparatus and, in particular, it is desired to correct chromatic aberration of magnification to be extremely small in a wave band of a visible range. There is a method of using anomalous dispersion glass as a method of satisfactorily correcting chromatic aberration of magnification including the g line. Such an image pick-up lens is proposed, for example, in Japanese Patent Application Laid-open Nos. 5-134174, 7-181376 and 7-248447. In the embodiments disclosed in these laid-open patent applications, chromatic aberration of magnification is corrected in a wide wave length range including the g line using two to three pieces of anomalous dispersion glass. However, it is very difficult to process such anomalous dispersion glass.

In addition, recently, a diffractive optical element (DOE) utilizing a diffraction phenomenon attracts attention as a chromatic aberration correction element. An optical property of the DOE is different from that of a conventional refraction lens and has reverse dispersibility and anomalous dispersibility characteristics of an Abbe number $\nu=-3.45$ and a partial dispersion ratio $\theta gf=0.296$. This is described in, for example, the thesis "Hybrid diffractive-refractive lenses and achromats", Thomas Stone and Nicholas George, Applied Optics, 27, 14, 2960–2971 (1988. 7. 15). It is well known that chromatic aberration correction is possible with only one member by providing a DOE of a positive weak optical power in a refraction lens of a positive optical power utilizing these characteristics. In recent years, embodiments of various image pick-up lenses have been suggested utilizing the characteristics of the DOE. For example, the embodiment of U.S. Pat. No. 5,148,314 to Chungte W. Chen describes an eyepiece, a Petzval type lens, a large aperture lens, a telephoto lens, and the like, and discloses that chromatic aberration and off-axis aberration can be corrected by using a DOE in an optical system.

In addition, Japanese Patent Application Laid-open Nos. 6-331898 (corresponding to U.S. Pat. No. 5,631,779), 6-331887 (corresponding to U.S. Pat. No. 5,629,799), 6-347700 corresponding to U.S. Pat. No. 5,631,779) and 6-324262 (corresponding to U.S. Pat. No. 5,790,321), Japanese Patent Translation Publication No. 8-508116 (corresponding to U.S. Pat. No. 5,543,966), and the like disclose the embodiments in which a diffractive optical element is applied to an objective lens, a projection lens, a standard lens for photography and the like. Moreover, as examples in which a diffractive optical element is applied to a wide-angle lens, there are enumerated Japanese Patent Application Laid-open Nos. 10-11577 (corresponding to U.S. Pat. No. 5,982,942), 11-64728 (corresponding to U.S. Pat. No. 6,010,537) and 2000-66092.

Since image pick-up lenses described in Japanese Patent Application Laid-open Nos. 10-11577 and 11-64728 correct on-axis chromatic aberration and chromatic aberration of magnification, optical power of a diffractive optical element tends to be strong on an axis. When optical power of a diffractive optical element becomes strong on an axis, there arise the following problems.

a. Since a grating pitch of a concentric grating forming the diffractive optical element narrows and the number of orbicular zones increases, it becomes difficult to make the diffractive optical element.

b. Since an aspect ratio (height/pitch of a grating) of an element becomes larger, a percentage of diffraction light (additional diffraction light, also known as unnecessary diffraction light) of orders other than a design order increases to make larger flare.

c. Since a diffraction angle becomes larger, a spot by additional diffraction light on an image forming surface becomes large.

d. Flare caused by additional diffraction light is conspicuous around a light source when a high luminance light source enters a screen.

These problems will be hereinafter described more specifically.

FIGS. 12A and 12B show a conventional optical system using a diffractive optical element that utilizes diffraction light of a positive first order. FIG. 12A shows light beam of a positive first order (first order diffraction light) and FIG. 12B shows light beam of a positive second order. As shown in the figures, the light beam of the positive second order (second order diffraction light) defocuses greatly.

FIG. 13 shows a spot on a surface of an image obtained by the conventional optical system using the diffractive optical element that utilizes diffraction light of a positive first order. A unit of a numerical value of the optical system which is used here is mm. As shown in the figure, since the light beam defocuses greatly, it forms a spot of approximately 6 mm on the surface of the image. Although not shown in the figure, light beam of a zero-th order defocuses in the opposite direction of the positive second order and forms a spot of the same size.

Originally, although a diffraction efficiency is desirably 100% in an objective order, the 100% diffraction efficiency cannot be realized due to limitations of design and tolerance. Even if a laminated DOE is used, a maximum value of the diffraction efficiency is in the order of 98% and the remaining 1 to 2% of light becomes additional diffraction light.

For example, if a person 2 is photographed against light as a subject with the sun 1 in the background as shown in FIG. 14 using such an optical system, flare 3 due to additional diffraction light appears around the silhouette of the person 2. In addition, flare due to the additional diffraction light is also conspicuous around a high luminance light source.

SUMMARY OF THE INVENTION

The present invention has been devised in view of the above drawbacks, and it is an object of the present invention to provide an optical system in which chromatic aberration of magnification of a high order is satisfactorily corrected and flare caused by additional diffraction light (unnecessary diffraction light) is suppressed to as minimum as possible while maintaining a high imaging performance up to peripheral part of a field angle.

In order to attain the above-mentioned object, an optical system of an embodiment to be described later is characterized in that it is provided with a diffractive optical element which has a configuration such that a phase given to incident light from an optical axis toward the peripheral part in the radial direction is not reversed in an effective area and an absolute value of optical power on the optical axis is made minimum.

If this diffractive optical element is disposed ahead of an aperture stop of the optical system (at the object side in an image-taking system), the diffractive optical element is preferably configured such that optical power decreases from the optical axis toward the peripheral part in the radial direction in the effective area.

Conversely, if the diffractive optical element is disposed in behind the aperture stop of the optical system (at the image side in the image-takig system), the diffractive optical element is preferably configured such that optical power increases from the optical axis toward the peripheral part in the radial direction in the effective area.

In the case of an optical system of a so-called negative lead type in which optical power becomes negative in a lens unit disposed in the foremost part (at the object side of the image-taking system), it is preferable to provide the diffractive optical element in a foremost or rearmost lens unit.

More detailed configurations of an optical system, a diffractive optical element and an optical apparatus will be clarified in the following descriptions of embodiments.

BRIEF DESCRIPTION OF THE DRAWINGS

The accompanying drawings, which are incorporated in and constitute a part of the specification, illustrate an embodiment mode of the invention and, together with the description, serve to explain the principles of the invention.

FIGS. 7A, 7B and 7C are views of aberration of the optical system of FIG. 1;

FIGS. 8A, 8B and 8C are views of aberration of the optical system of FIG. 2;

FIGS. 9A, 9B and 9C are views of aberration of the optical system of FIG. 3;

DETAILED DESCRIPTION OF THE PREFERRED EMBODIMENTS

Embodiments of an optical system of the present invention will be described with reference to the drawings.

Figure 1:
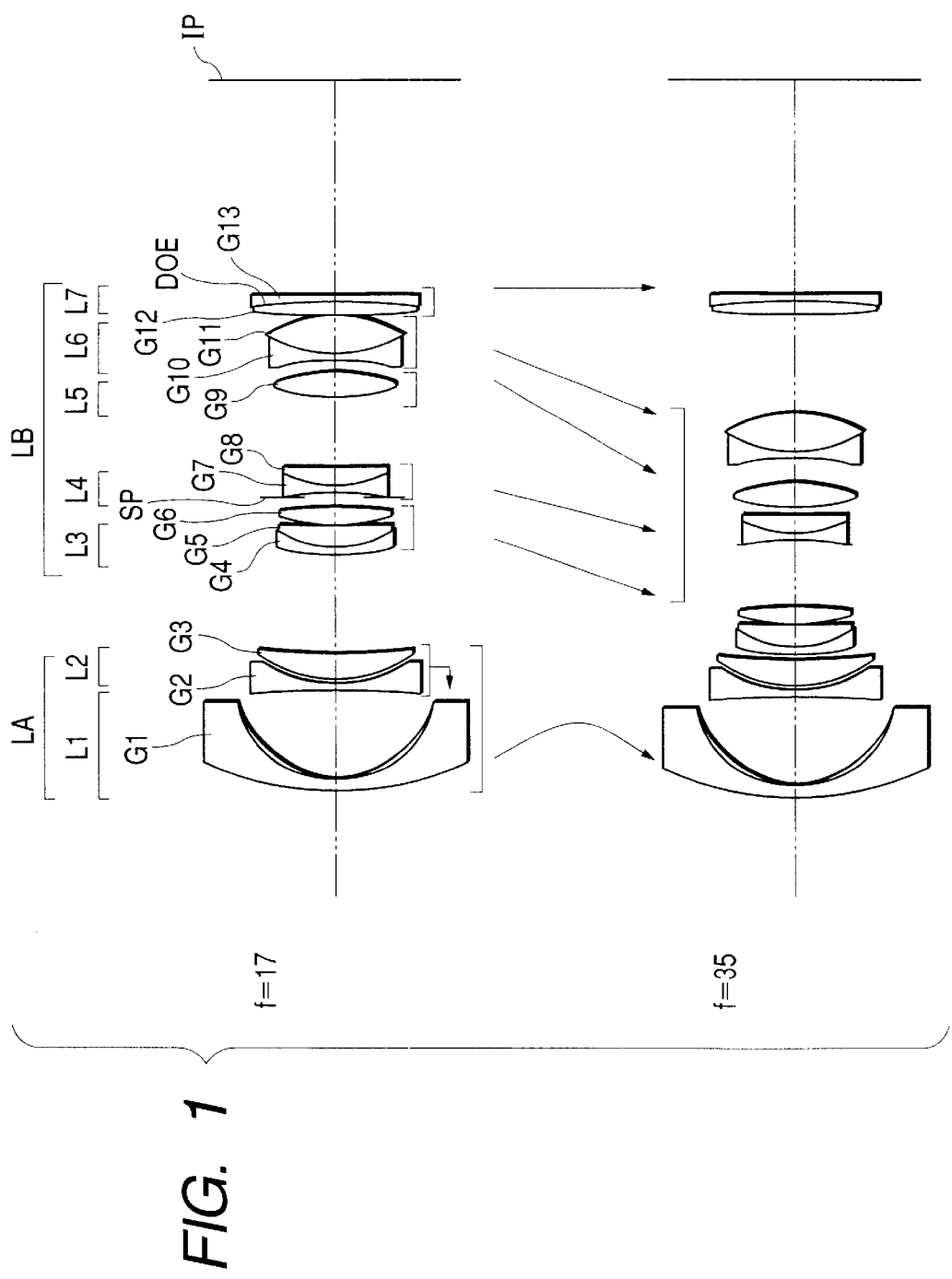
FIG. 1 is a sectional view of an optical system of a first numerical embodiment.
Figure 2:
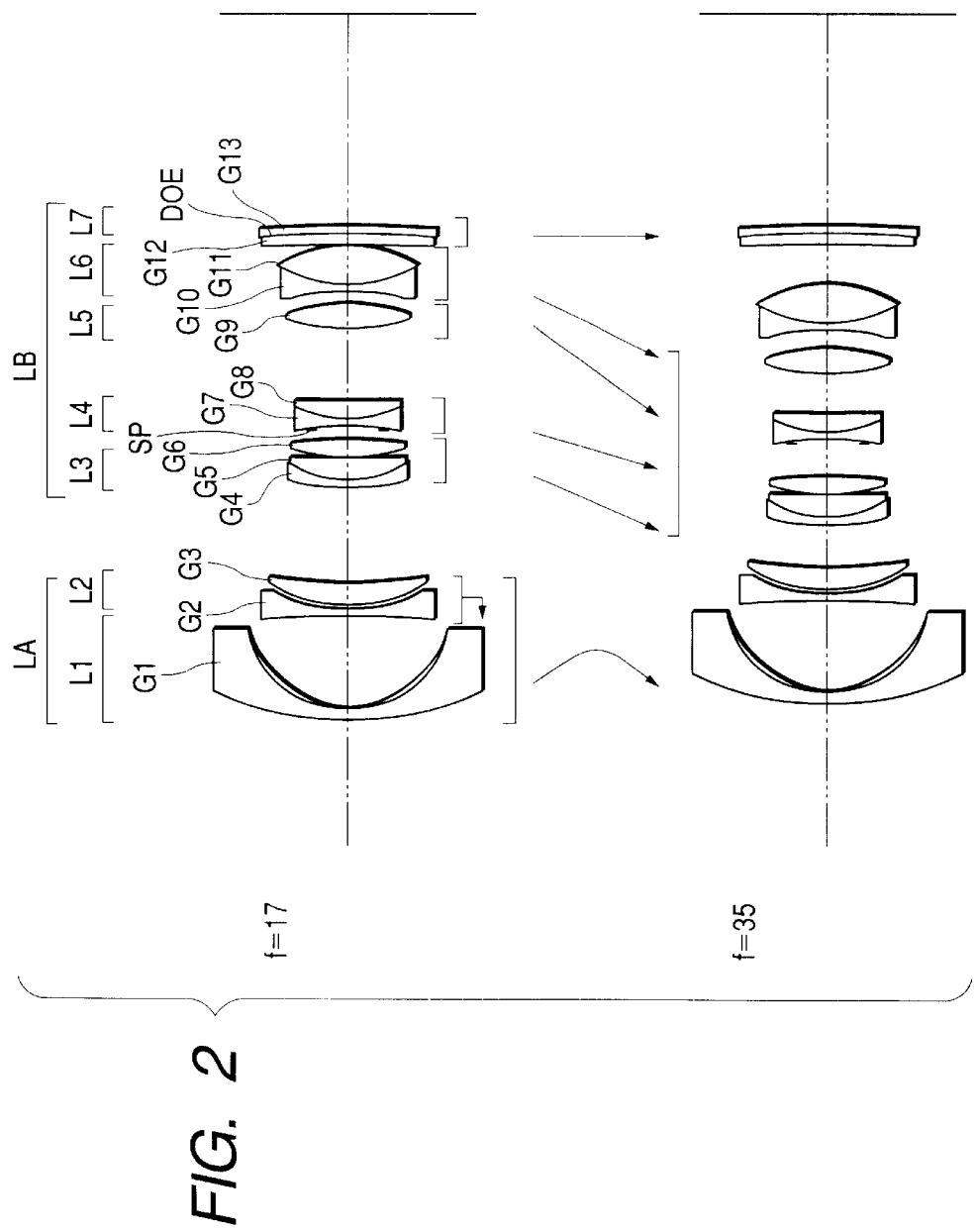
FIG. 2 is a sectional view of an optical system of a second numerical embodiment.
Figure 3:
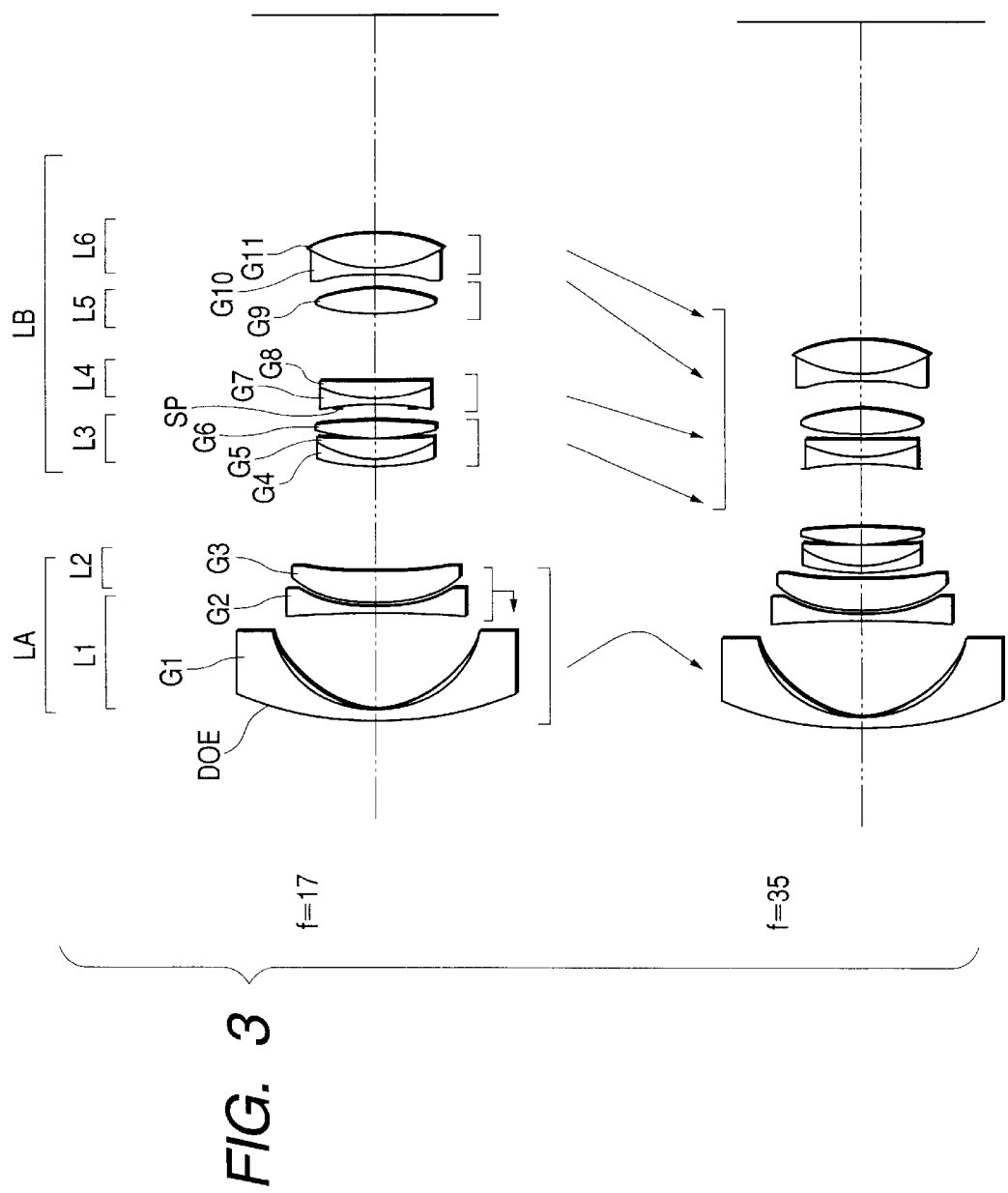
FIG. 3 is a sectional view of an optical system of a third numerical embodiment.

FIGS. 1, 2 and 3 are sectional views of optical systems of first to third numerical embodiments, numerical data of which will be shown later.

The optical system shown in FIGS. 1 and 2 has a front lens part (first lens group) LA of optical power (i.e., an inverse of a focal distance), which is negative as a whole, and a rear lens part (second lens group) LB of optical power, which is positive as a whole, in order from an object side (front) to an image side (rear).

Moreover, the front lens part LA consists of a first unit L1 of negative optical power and a second unit L2 of negative optical power. The rear lens portion LB consists a third unit L3 of positive optical power, a fourth unit L4 of negative optical power, a fifth unit L5 of positive optical power, a sixth unit L6 of negative optical power and a seventh unit L7 of substantially non-power.

Reference character SP denotes an aperture stop for determining brightness of an optical system and IP denotes an image surface.

Focusing from an infinite distance object to a near distance object is carried out by moving the second unit L2 toward the object side.

For zooming from a wide-angle end (short focal point distance end) to a telephoto end (long focal point distance end), the first unit L1 and the second unit L2 of the front lens part LA integrally move to the image side temporarily and then move to the object side. That is, the movement of the first unit L1 and the second unit L2 of the front lens part LA draw a locus which is convexed toward the image side. Any of the third unit L3, the fourth unit L4, the fifth unit L5 and the sixth unit L6 of the rear lens part LB moves toward the object side while keeping the interval between the third unit L3 and the sixth unit L6 constant. In moving, the interval between the third unit L3 and the fourth unit L4 and the interval between the fifth unit L5 and the sixth unit L6 increase and the interval between the fourth unit L4 and the fifth unit L5 decreases.

The first unit L1 consists of a negative meniscus lens G1, a convex surface of which faces the object side, and a surface of the meniscus lens G1 on the image side is an aspherical surface that is formed by a replica method.

The second unit L2 consists of a negative lens G2 and a positive lens G3 and a surface of the negative lens G2 on the object side is an aspherical surface formed by the replica method.

The third unit L3 consists of a cemented lens of a negative lens G4 and a positive lens G5, and a positive lens G6.

The fourth unit L4 consists of a stop SP and a cemented lens of a negative lens G7 and a positive lens G8.

The fifth unit L5 consists of a positive lens G9 having a convex surface on two sides and the sixth unit L6 consists of a cemented lens of a negative lens G10 having a concave surface on the image side and a positive lens G11 having a convex surface on two sides. The surface of the negative lens G10 on the object side is aspherical.

The seventh unit L7 consists of a positive lens G12 and a negative lens G13 and has a diffractive optical element DOE between them. Further, in this specification, the term "diffractive optical element" indicates a portion that is provided in a member and performs a diffractive action. More specifically, it is composed of a concentric phase grating or the like for giving a desired phase to transmitted light. If a height of a grating can be neglected from the geometrically optical viewpoint, "diffractive optical element" may be treated as a "diffractive surface".

Figure 4A:
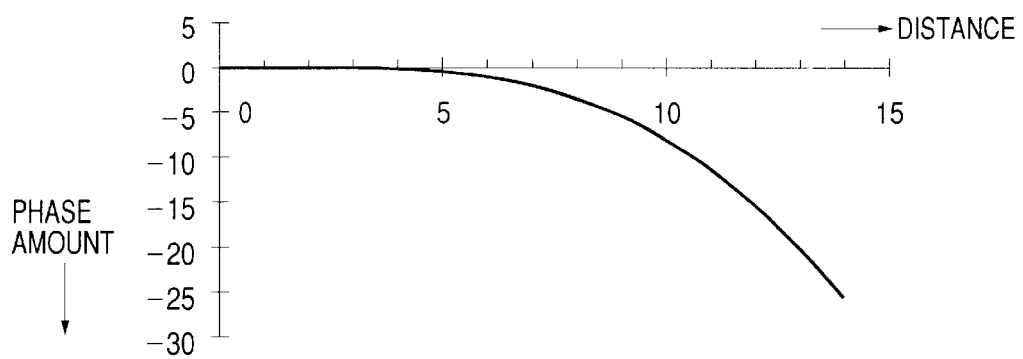
FIGS. 4A and 4B are graphs showing a phase and optical power of the diffractive optical element of the optical system of FIG. 1, respectively.
Figure 5A:
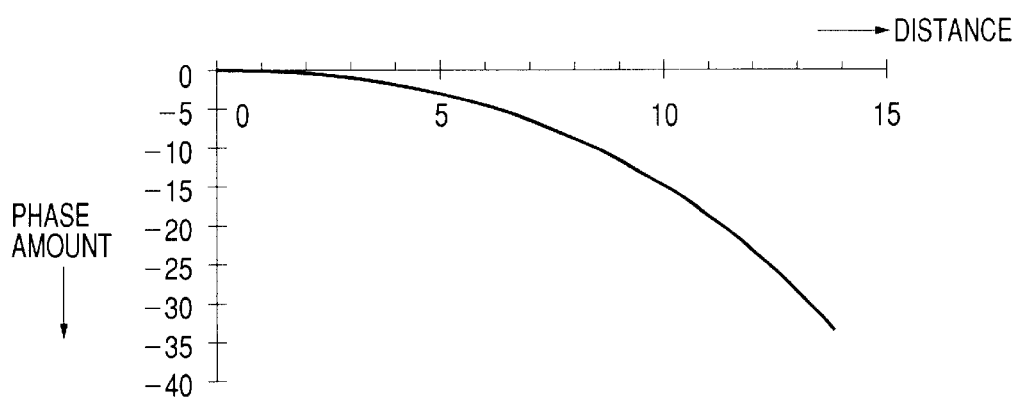
FIGS. 5A and 5B are graphs showing a phase and optical power of the diffractive optical element of the optical system of FIG. 2, respectively.

FIGS. 4A and 5A show phases given by diffractive optical elements of optical systems of first and second embodiments. Horizontal axes indicate a distance in the radial direction on the basis of an optical axis and vertical axes indicate a phase amount on the basis of a phase on the optical axis. The phases given by the diffractive optical elements are negative in an effective radius and is not reversed from the optical axis toward the peripheral part in the radial direction. Here, "the phase is not reversed" means that the sign of the phase does not change from positive to negative or negative to positive.

Figure 4B:
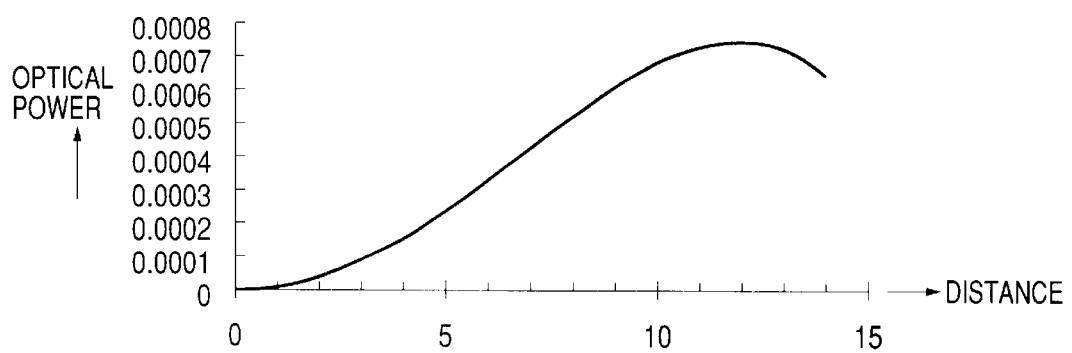
Figure 5B:
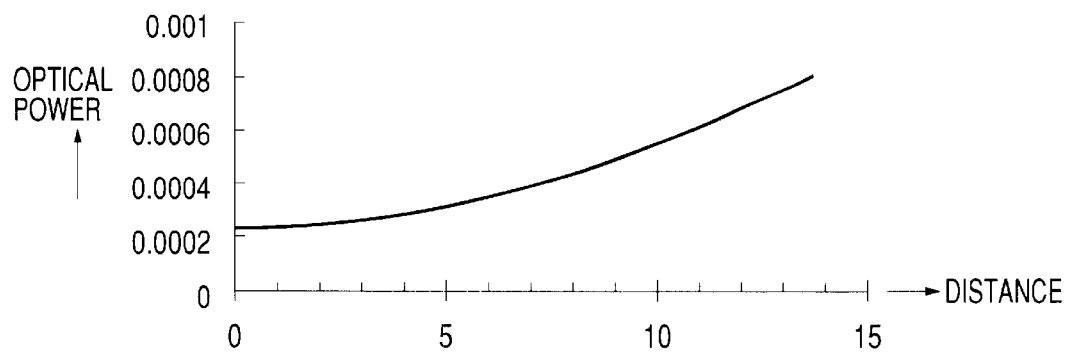

FIGS. 4B and 5B show optical power of the diffractive optical elements of the optical systems of the first and the second embodiments. Horizontal axes indicate a distance in the radial direction on the basis of an optical axis and vertical axes indicate optical power. The optical power of the diffractive optical elements is zero on the axis and increases from the optical axis toward the peripheral part in the radial direction.

The optical system shown in FIG. 3 has a front lens part (first lens group) LA having a negative optical power as a whole, and a rear lens part (second lens group) LB having a positive optical power as a whole, in order from an object side (front) to an image side (rear).

Moreover, the front lens part LA consists of a first unit L1 of negative optical power and a second unit L2 of negative optical power. The rear lens part LB consists a third unit L3 of positive optical power, a fourth unit L4 of negative optical power, a fifth unit L5 of positive optical power, and a sixth unit L6 of negative optical power.

Reference character SP denotes an aperture stop and IP denotes a surface of an image.

Focusing from an infinite distance object to a near distance object is carried out by moving the second unit L2 toward the object side.

For zooming from a wide-angle end (short focal point distance end) to a telephoto end (long focal point distance end), the first unit L1 and the second unit L2 of the front lens part LA integrally move toward the image side temporarily and then move toward the object side. That is, the movement of the first unit L1 and the second unit L2 of the front lens part LA draw a locus which is convexed toward the image guide. Any of the third unit L3, the fourth unit L4, the fifth unit L5 and the sixth unit L6 of the rear lens part LB moves toward the object side while keeping the interval between the third unit L3 and the sixth unit L6 constant. In moving, the interval between the third unit L3 and the fourth unit L4 and the interval between the fifth unit L5 and the sixth unit L6 increase and the interval between the fourth unit L4 and the fifth unit L5 decreases.

The first unit L1 consists of a negative meniscus lens G1, a convex surface of which faces the object side, and a diffractive optical element DOE is provided on a surface of the meniscus lens G1 on the object side.

The second unit L2 consists of a negative lens G2 and a positive lens G3 and a surface of the negative lens G2 on the object side is an aspherical surface formed by the replica method.

The third unit L3 consists of a cemented lens of a negative lens G4 and a positive lens G, and a positive lens G6.

The fourth unit L4 consists of a stop SP and a cemented lens of a negative lens G7 and a positive lens G8.

The fifth unit L5 consists of a positive lens G9 having a convex surface on two sides and the sixth unit L6 consists of a cemented lens of a negative lens G10 having a concave surface on the image side and a positive lens G11 having a convex surface on two sides. The surface of the negative lens G10 on the object side is aspherical.

Figure 6A:
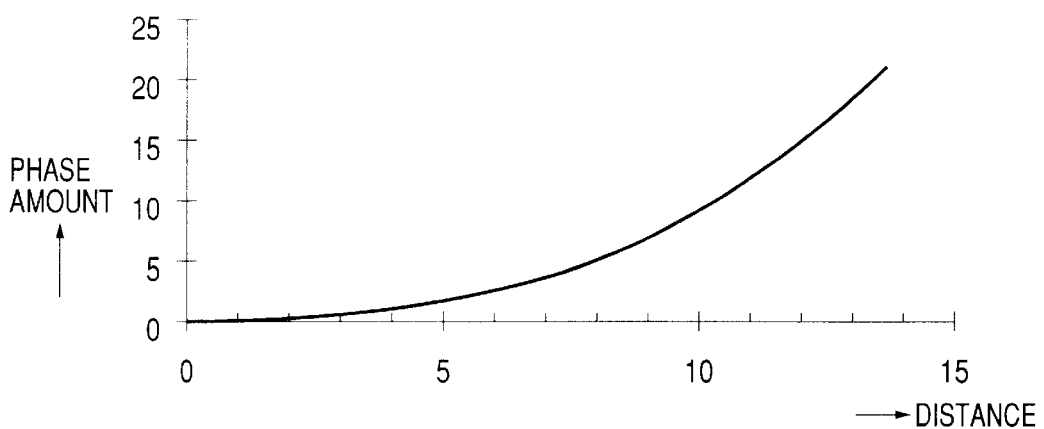
FIGS. 6A and 6B are graphs showing a phase and optical power of the diffractive optical element of the optical system of FIG. 3, respectively.

FIG. 6A shows phases given by diffractive optical elements of optical systems of the third embodiment. Horizontal axis indicates a distance in the radial direction on the basis of an optical axis and vertical axis indicates a phase amount on the basis of a phase on the optical axis. The phases given by the diffractive optical elements are positive in an effective radius and is not reversed from the optical axis toward the peripheral part in the radial direction.

Figure 6B:
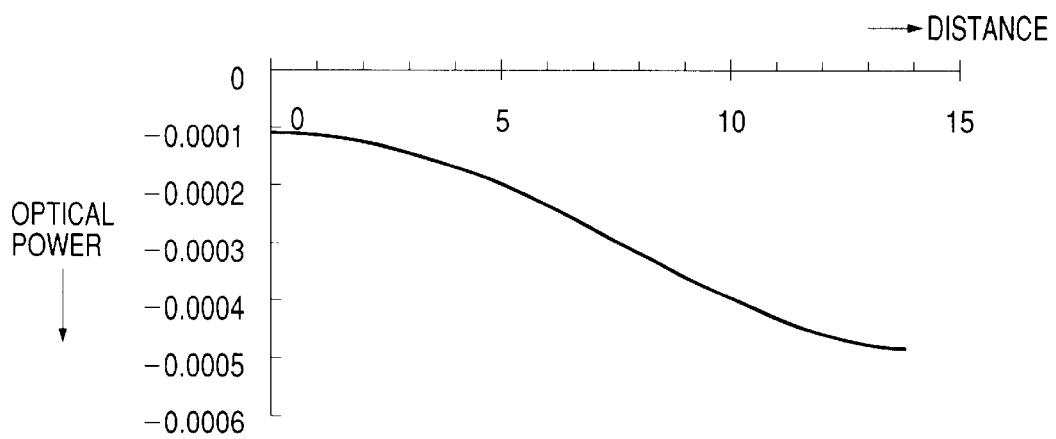

FIG. 6B shows optical power of the diffractive optical elements of the optical systems of the third embodiment. Horizontal axis indicates a distance in the radial direction on the basis of an optical axis and vertical axis indicates optical power. The optical power of the diffractive optical elements is zero on the axis and decreases from the optical axis toward the peripheral part in the radial direction.

As described above, the optical system of this embodiment has at least one diffractive optical element and a concentric grating is formed which configures a diffractive optical element in a shape in which a phase given by the diffractive optical element to incident light is not reversed from an optical axis toward the peripheral part in the radial direction and an absolute value of optical power of the diffractive optical element becomes minimum in the vicinity of the optical axis. Here, a single layer grating or a plural layer grating as disclosed in EP0895099A3 can be applied as the grating.

Reducing optical power on an axis of a diffractive optical element to zero or extremely small means that light beam of an order that is mainly used, for example, first order light beam (first order diffraction light beam) and additional diffraction light beam of other orders substantially overlap to form an image. Thus, flare due to additional diffraction light does not appear.

In addition, since optical power of the diffractive optical element is small, first order diffraction light and additional diffraction light are close to each other even in an off-axis portion and flare due to additional diffraction light is rarely conspicuous in the entire area of an image.

In addition, since optical power is weak as a whole, the number of orbicular zones of a grating formed in a concentric shape decreases and a diffractive optical element can be easily made When a diffractive optical element DOE is disposed on the object side with respect to the stop SP as in the optical system of third numerical embodiment, it is preferable that optical power of the diffractive optical element DOE decreases from an optical axis t When a diffractive optical element DOE is toward the peripheral part in the radial direction. Conversely, when a diffractive optical element DOE is disposed on the image side with respect to the stop SP as in an optical systems of first and second numerical embodiments, it is preferable that optical power of the diffractive optical element DOE increases from an optical axis toward the peripheral part in the radial direction.

With such a configuration, it becomes possible to satisfactorily correct chromatic aberration of magnification of a high order in a lens system (zoom lens) of a so-called negative lead type in which a lens unit of negative optical power is placed ahead of a lens unit of positive optical power.

In addition, when a maximum value of an absolute value of optical power of a diffractive optical element DOE is φmax and a minimum value of an absolute value of optical power of the diffractive optical element DOE is φmin, it is preferable that a condition represented by the following expression is satisfied.

$$(\phi max - \phi min)/(\phi max + \phi min) > 0.5 \quad (1)$$

The conditional expression (1) is a conditional expression for limiting power on an axis with respect to a power variation amount of the diffraction optical element DOE which is required for correction of chromatic aberration of magnification of a high order. If this condition is not satisfied, even if chromatic aberration of magnification is satisfactorily corrected, a defocus amount on an imaging surface of additional diffraction light increases and flare is conspicuous, which is not preferable.

It is preferable that a diffractive optical element DOE is provided in a foremost unit or a rearmost unit in the case of a zoom lens of a negative lead type that begins with a lens unit of negative optical power.

In order to satisfactorily correct chromatic aberration of magnification, it becomes easy to correct aberration if off-axis light beam is caused to be incident on a high position from an optical axis of a diffractive optical element. Thus, it is preferable to dispose the diffractive optical element in a position more distant than a stop SP. For example, if the diffractive optical element is disposed on the front side (object side) with respect to the stop SP, it is preferable to dispose it in a foremost lens unit (lens unit disposed at the object side). On the other hand, if the diffractive optical element is disposed on the image side with respect to the stop SP, it is preferable to dispose it in a rearmost lens unit (lens unit disposed at the image side).

Further, when a lens unit provided with a diffractive optical element is a last unit as in the optical systems of the first and the second numerical embodiments, it is preferable that this lens unit does not move for zooming.

A diffraction efficiency of a diffractive optical element varies depending on an angle of incidence of light. In order to maintain the diffraction efficiency high, it is preferable to configure the diffractive optical element such that the incident angle does not vary as much as possible within a desired value range. If a diffractive optical element is disposed in a moving rear lens unit in a zoom lens, since the incident angle of light on the diffractive optical element varies greatly by zooming, it becomes difficult to maintain the diffraction efficiency high. Thus, it is preferable to fix a lens unit provided with a diffractive optical element. Consequently, it becomes possible to suppress variation of an incident angle due to zooming to minimum and realize a high diffraction efficiency.

Data of the first to the third numerical embodiments will be hereinafter shown. Reference character ri denotes a radius of curvature on an i-th surface counted from the object side, di denotes an i-th interval of surfaces on the axis in a standard state counted from the object side, ni and νi denote an index of refraction and an Abbe's number of an i-th member counted from the object side for d line, respectively. Reference character f denotes a focal length, Fno denotes an F number and 2ω denotes an angle of view.

A shape of an aspherical surface is represented by the following expression when it is assumed that k, A, B, C and D are aspherical coefficients, a traveling direction of light is positive, a distance along an optical axis between a crossing point of a lens surface and the optical axis and the aspherical surface is X and a distance between an optical axis and the aspherical surface in a direction perpendicular to the optical sxis is Y.

$$X = \frac{Y^2/r}{1 + \sqrt{1-(1+k)(Y/r)^2}} + AY^2 + BY^4 + CY^6 + DY^8 \quad \text{[Expression 1]}$$

In addition, a diffraction optical element is formed in a shape for giving a phase ψ(h,m) represented by the following expression.

$$\psi(h,m) = (2\pi/m \cdot \lambda 0)(C2 \cdot h^2 + C4 \cdot h^4 + C6 \cdot h^6 \ldots)$$

Here, h is a height a direction perpendicular to an optical axis;

m is a diffraction order of diffractive light;

λ is a design wave length; and $C_i$ is a phase coefficient (i=1, 2, 3 . . . ).

In each embodiment, the diffraction order m of diffraction light is first order and the design wave length λ is a wave length of the d line (587.56 nm).

Figure 7A:
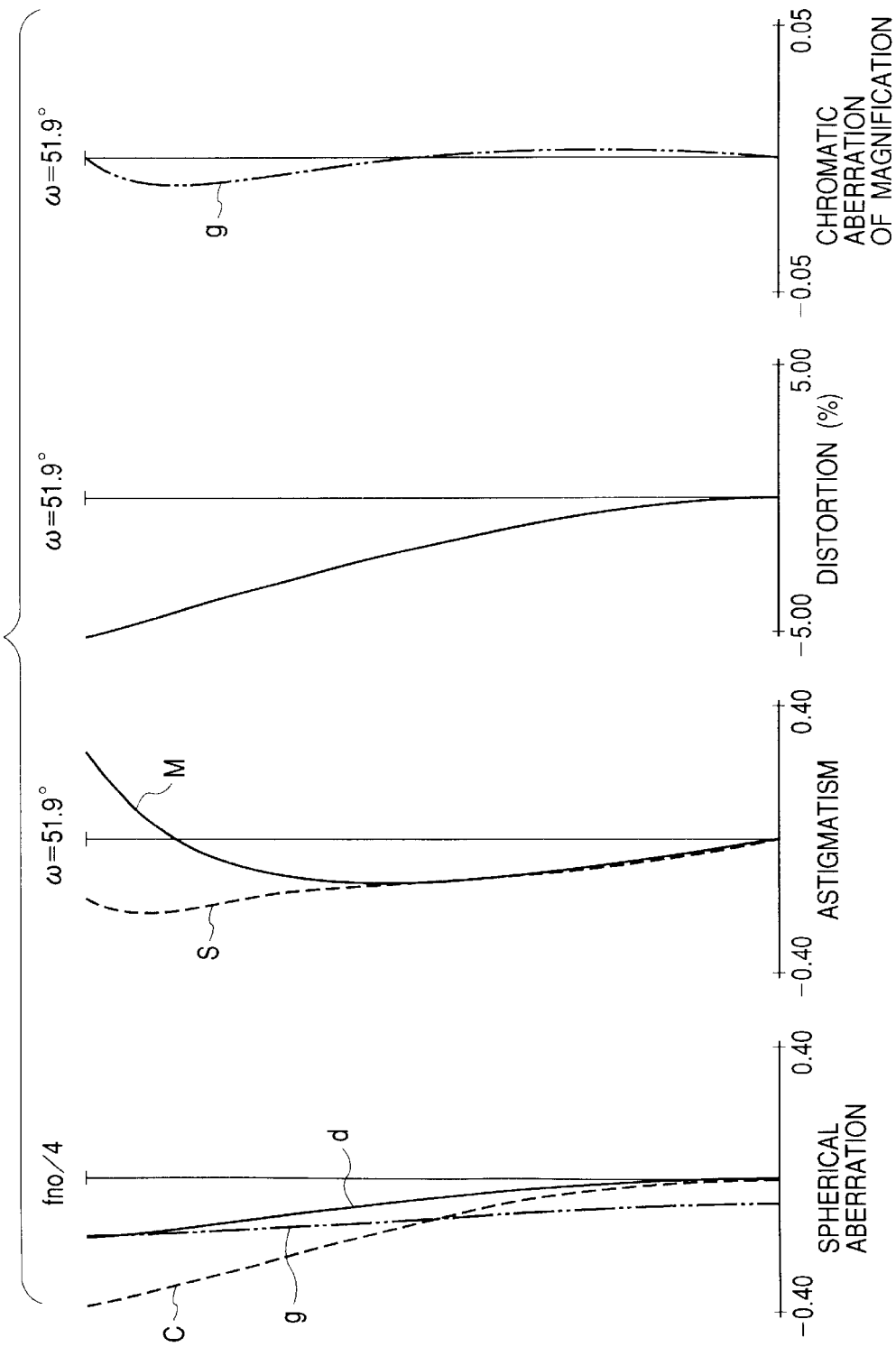
Figure 8A:
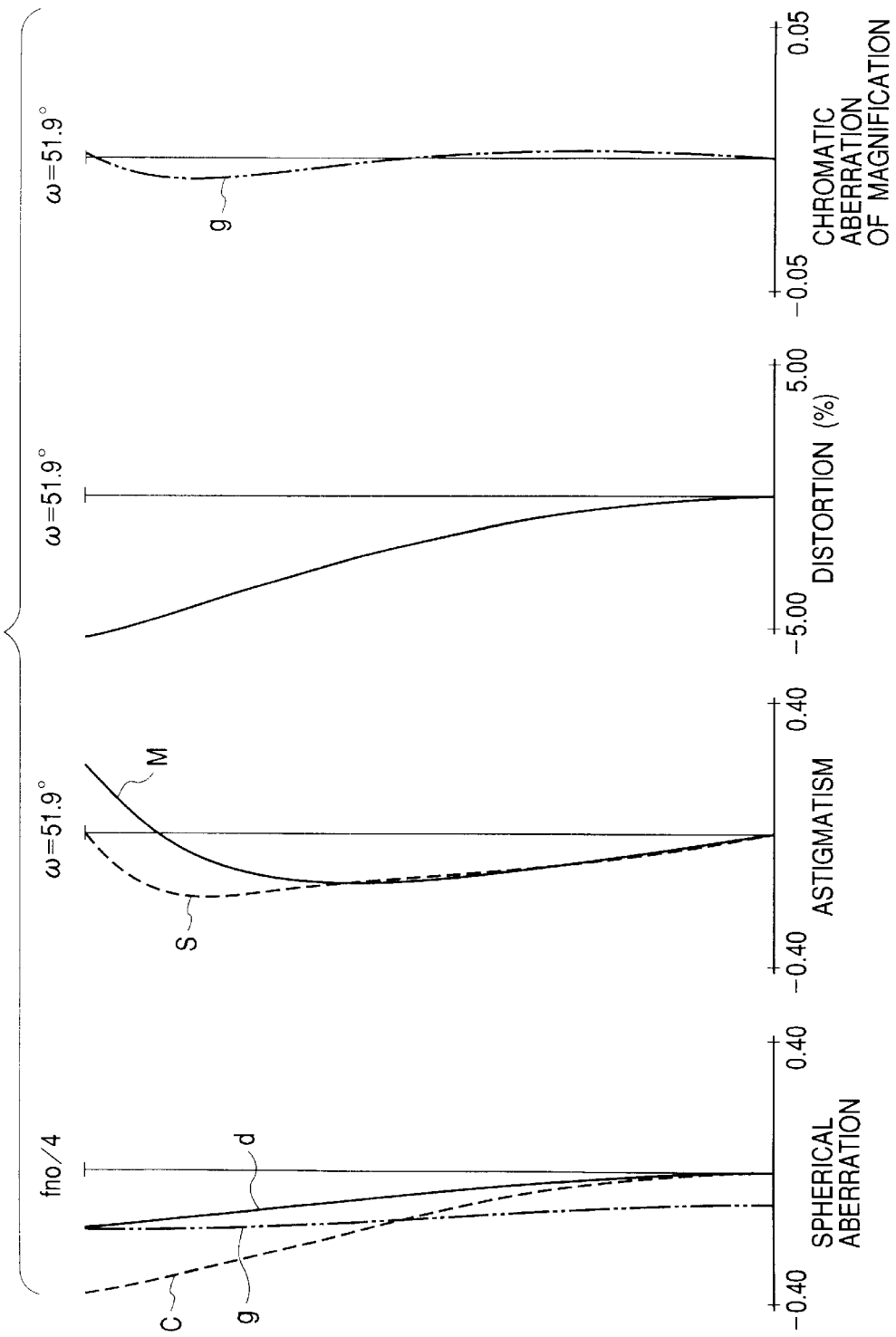
Figure 9C:
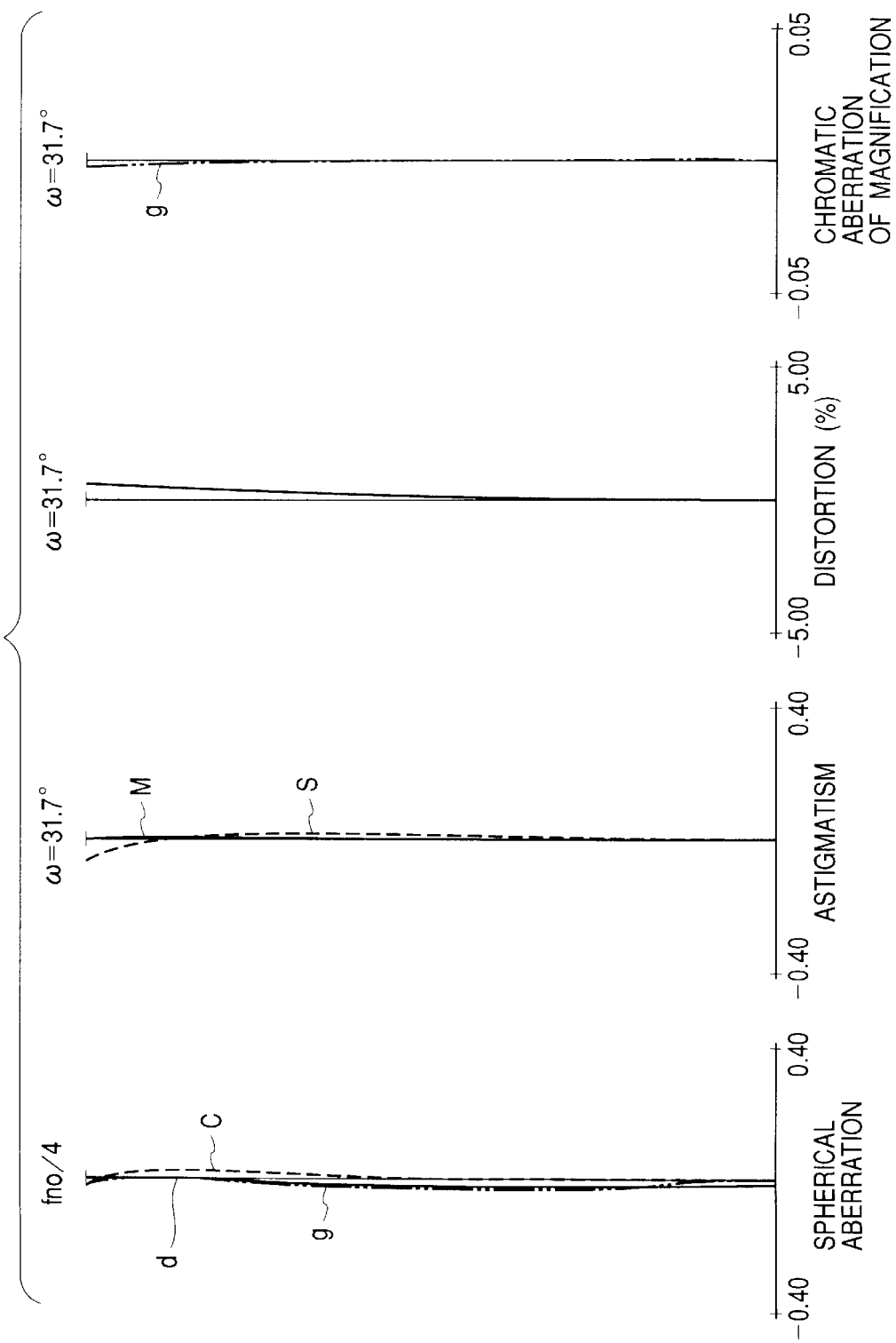

Various aberration charts of the optical systems of the first to the third numerical embodiments are shown in FIGS. 7A to 7C through FIGS. 9A to 9C, respectively. FIGS. 7A, 8A and 9A show the aberration charts in a wide-angle end, FIGS. 7B, 8B and 9B show the aberration charts in an intermediate focal length and FIGS. 7C, 8C and 9C show the aberration charts in a telephoto end, respectively.

| First numerical embodiment | | |
|---|---|---|
| f = 16.9999 - 35 | fno. = 4 | 2ω = 103.7° - 64.3° |
| r1 = 54.581 | d1 = 2.00 | n1 = 1.81600  ν1 = 46.6 |
| r2 = 17.745 | d2 = 0.05 | n2 = 1.51421  ν2 = 50.4 |
| r3 = 13.430(aspherical surface) | d3 = 15.55 | |
| r4 = −232.076(aspherical surface) | d4 = 0.05 | n3 = 1.51421  ν3 = 50.4 |
| r5 = −226.953 | d5 = 1.20 | n4 = 1.49700  ν4 = 81.5 |
| r6 = 22.580 | d6 = 0.53 | |
| r7 = 22.662 | d7 = 4.53 | n5 = 1.49321  ν5 = 65.6 |
| r8 = 97.341 | d8 = variable | |
| r9 = 45.059 | d9 = 1.20 | n6 = 1.80997  ν6 = 26.1 |
| r10 = 18.068 | d10 = 3.87 | n7 = 1.57790  ν7 = 47.2 |
| r11 = −6930.771 | d11 = 0.15 | |
| r12 = 35.678 | d12 = 3.04 | n8 = 1.79536  ν8 = 47.2 |
| r13 = −107.835 | d13 = variable | |
| r14 = INFINITY (stop) | d14 = 0.62 | |
| r15 = −64.286 | d15 = 1.20 | n9 = 1.81600  ν9 = 46.6 |
| r16 = 19.502 | d16 = 3.08 | n10 = 1.80800  ν10 = 22.8 |
| r17 = 151.124 | d17 = variable | |
| r18 = 34.674 | d18 = 4.48 | n11 = 1.51266  ν11 = 66.0 |
| r19 = −29.067 | d19 = variable | |
| r20 = −49.000(aspherical surface) | d20 = 1.20 | n12 = 1.81224  ν12 = 31.3 |
| r21 = 23.997 | d21 = 6.76 | n13 = 1.49700  ν13 = 81.5 |
| r22 = −23.474 | d22 = variable | |

-continued

First numerical embodiment

| | | | |
|---|---|---|---|
| r23 = 522.224 | d23 = 2.26 | n14 = 1.63679 | ν14 = 55.6 |
| r24 = −150.000 | d24 = 1.20 | n15 = 1.80800 | ν15 = 22.8 |
| (diffractive surface) | | | |
| r25 = 2444.511 | d25 = 37.00 | | |

| | Focal length | | |
|---|---|---|---|
| Variable interval | 17 | 24 | 35 |
| d8 = | 17.38 | 7.71 | 1.00 |
| d13 = | 2.00 | 6.46 | 10.98 |
| d17 = | 12.56 | 7.37 | 1.32 |
| d19 = | 2.00 | 2.73 | 4.26 |
| d22 = | 0.10 | 6.68 | 17.46 |

| Aspherical coefficient | Third surface | Fourth surface | Twentieth surface |
|---|---|---|---|
| K = | −0.775 | −663.822 | 3.757 |
| A = | 1.298E−06 | −8.701E−06 | −1.657E−05 |
| B = | −2.917E−08 | 3.645E−08 | −7.414E−09 |
| C = | 1.014E−10 | −5.646E−11 | 5.325E−11 |
| D = | −1.746E−13 | 3.401E−14 | 3.491E−13 |

| Diffractive surface | Phase coefficient Twenty-fourth surface |
|---|---|
| C4 = | −8.614E−07 |
| C6 = | 1.207E−09 |

$\phi max = 0.00074$
$\phi min = 0.00000$
$(\phi max - \phi min)/(\phi max + \phi min) = 1.00$

Second numerical embodiment

| | | | |
|---|---|---|---|
| f = 16.9999 − 35 | fno. = 4 | 2ω = 103.7° − 64.3° | |
| r1 = 52.016 | d1 = 2.00 | n1 = 1.81600 | ν1 = 46.6 |
| r2 = 17.615 | d2 = 0.05 | n2 = 1.51421 | ν2 = 50.4 |
| r3 = 13.314(aspherical surface) | d3 = 15.52 | | |
| r4 = −178.785(aspherical surface) | d4 = 0.05 | n3 = 1.51421 | ν3 = 50.4 |
| r5 = −162.783 | d5 = 1.20 | n4 = 1.49700 | ν4 = 81.5 |
| r6 = 26.999 | d6 = 0.80 | | |
| r7 = 25.868 | d7 = 3.82 | n5 = 1.50146 | ν5 = 60.5 |
| r8 = 85.779 | d8 = variable | | |
| r9 = 43.706 | d9 = 1.20 | n6 = 1.81145 | ν6 = 29.3 |
| r10 = 17.863 | d10 = 3.80 | n1 = 1.57680 | ν7 = 50.9 |
| r11 = 14036.274 | d11 = 0.15 | | |
| r12 = 36.956 | d12 = 2.94 | n8 = 1.79537 | ν8 = 47.2 |
| r13 = −108.991 | d13 = variable | | |
| r14 = INFINITY stop | d14 = 0.64 | | |
| r15 = −62.016 | d15 = 1.20 | n9 = 1.81600 | ν9 = 46.6 |
| r16 = 21.981 | d16 = 2.94 | n10 = 1.80800 | ν10 = 22.8 |
| r17 = 220.196 | d17 = variable | | |
| r18 = 34.958 | d18 = 4.48 | n11 = 1.51049 | ν11 = 66.4 |
| r19 = −29.367 | d19 = variable | | |
| r20 = −51.298(aspherical surface) | d20 = 1.20 | n12 = 1.81204 | ν12 = 30.8 |
| r21 = 23.493 | d21 = 6.74 | n13 = 1.49700 | ν13 = 81.5 |
| r22 = −24.461 | d22 = variable | | |
| r23 = −531.381 | d23 = 1.96 | n14 = 1.71955 | ν14 = 51.6 |
| r24 = 150.000(diffractive surface) | d24 = 1.20 | n15 = 1.80800 | ν15 = 22.8 |
| r25 = −286.846 | d25 = 37.00 | | |

| | Focal length | | |
|---|---|---|---|
| Variable interval | 17 | 24 | 35 |
| d8 = | 16.80 | 7.49 | 1.00 |
| d13 = | 2.00 | 6.44 | 10.73 |
| d17 = | 12.56 | 7.24 | 1.26 |
| d19 = | 2.00 | 2.82 | 4.51 |
| d22 = | 0.10 | 7.29 | 18.82 |

| Aspherical coefficient | Third surface | Fourth surface | Twentieth surface |
|---|---|---|---|
| K = | −0.770 | −255.774 | 3.105 |
| A = | 1.604E−06 | −9.140E−06 | −1.538E−05 |
| B = | −2.536E−08 | 3.468E−08 | −1.636E−08 |
| C = | 1.072E−10 | −7.788E−11 | 1.149E−10 |
| D = | −2.489E−13 | 8.469E−14 | 3.012E−14 |

| Diffractive surface | Phase coefficient Twenty-fourth surface |
|---|---|
| C2 = | −1.150E−04 |
| C4 = | −2.742E−07 |
| C6 = | 4.326E−11 |

$\phi max = 0.00081$
$\phi min = 0.00023$
$(\phi max - \phi min)/(\phi max + \phi min) = 0.55$

Third numerical embodiment

| | | | |
|---|---|---|---|
| f = 16.9999 − 35 | fno. = 4 | 2ω = 103.7° − 64.3° | |
| r1 = 62.757(diffractive surface) | d1 = 2.00 | n1 = 1.81600 | ν1 = 46.6 |
| r2 = 18.151 | d2 = 0.05 | n2 = 1.51421 | ν2 = 50.4 |
| r3 = 13.338(aspherical surface) | d3 = 16.59 | | |
| r4 = 293037.245 (aspherical surface) | d4 = 0.05 | n3 = 1.51421 | ν3 = 50.4 |
| r5 = 1105.432 | d5 = 1.20 | n4 = 1.49700 | ν4 = 81.5 |
| r6 = 25.584 | d6 = 0.22 | | |
| r7 = 25.234 | d7 = 5.96 | n5 = 1.57573 | ν5 = 37.9 |
| r8 = 87.580 | d8 = variable | | |
| r9 = 39.874 | d9 = 1.20 | n6 = 1.81163 | ν6 = 29.7 |
| r10 = 16.983 | d10 = 3.87 | n7 = 1.58939 | ν7 = 57.6 |
| r11 = 474.170 | d11 = 0.15 | | |
| r12 = 37.934 | d12 = 2.95 | n8 = 1.80069 | ν8 = 47.0 |
| r13 = −130.338 | d13 = variable | | |
| r14 = INFINITY (stop) | d14 = 0.64 | | |
| r15 = −67.630 | d15 = 1.20 | n9 = 1.81515 | ν9 = 42.0 |
| r16 = 24.221 | d16 = 2.91 | n10 = 1.80800 | ν10 = 22.8 |
| r17 = 231.164 | d17 = variable | | |
| r18 = 30.315 | d18 = 4.46 | n11 = 1.49923 | ν11 = 68.1 |
| r19 = −28.222 | d19 = variable | | |
| r20 = −53.423(aspherical surface) | d20 = 1.20 | n12 = 1.81289 | ν12 = 33.2 |
| r21 = 20.356 | d21 = 5.92 | n13 = 1.49700 | ν13 = 81.5 |
| r22 = −27.711 | d22 = | | |

| | Focal length | | |
|---|---|---|---|
| Variable interval | 17 | 24 | 35 |
| d8 = | 18.30 | 8.17 | 1.00 |
| d13 = | 2.00 | 6.05 | 10.20 |
| d17 = | 11.57 | 6.72 | 1.32 |
| d19 = | 2.53 | 3.33 | 4.89 |
| d22 = | 37.58 | 44.41 | 55.10 |

| Aspherical coefficient | Third surface | Fourth surface | Twentieth surface |
|---|---|---|---|
| K = | −0.792 | 24030498.45 | 3.280 |
| A = | −6.308E−07 | −3.047E−06 | −1.689E−05 |
| B = | −2.663E−08 | 1.018E−08 | −3.948E−08 |
| C = | 7.265E−11 | −1.650E−11 | −2.000E−10 |
| D = | −1.740E−13 | 8.377E−15 | −2.306E−13 |

Phase coefficient

-continued

Third numerical embodiment

| Diffractive surface | Twenty-fourth surface |
|---|---|
| C2 = | 5.500E−05 |
| C4 = | 3.246E−07 |
| C6 = | −3.355E−10 |

$\phi$max = 0.00049
$\phi$min = 0.00011
($\phi$max − $\phi$min)/($\phi$max + $\phi$min) = 0.63

An embodiment of a video camera using the optical system of the present invention as an image-taking optical system will be described next with reference to FIG. 10.

Figure 10:
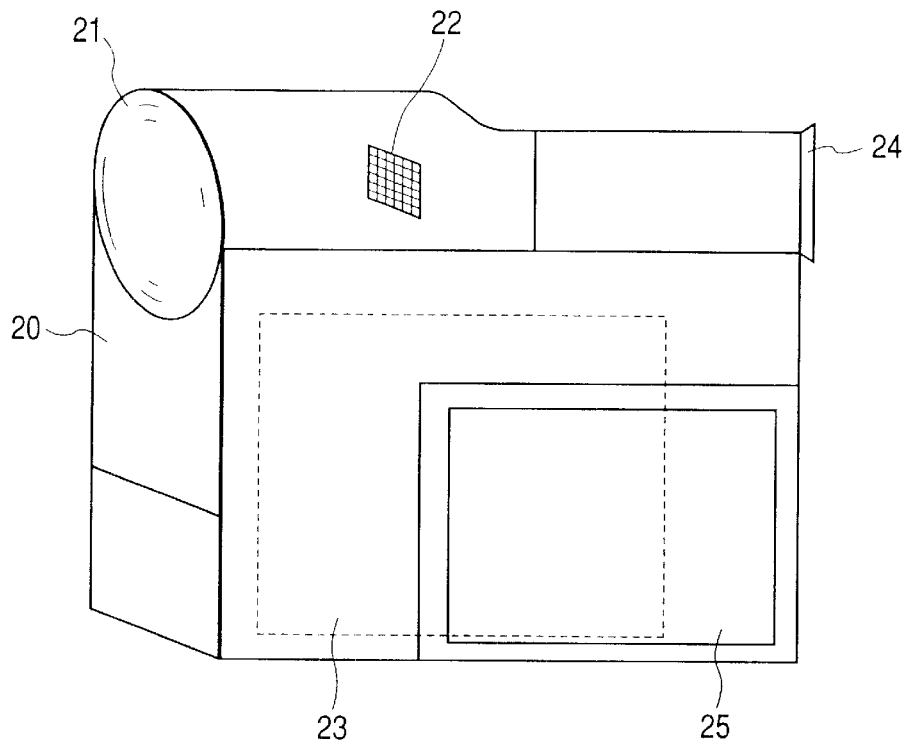
FIG. 10 is a schematic view of a main part of a video camera.

In FIG. 10, reference numeral 20 denotes a video camera main body, 21 denotes an image-taking optical system configured by the optical system of the present invention, 22 denotes an image pick-up element (photoelectric conversion element) such as CCD, CMOS or the like for receiving light of a subject image by the image-taking optical system 21, 23 denotes recording means for recording the subject image received by the image pick-up element 12, and 24 denotes an electronic view finder for observing the subject image displayed on a display element (not-shown). This display device is composed of a liquid crystal panels or the like, on which the subject image formed on the image pick-up element 22 is displayed. Reference numeral 25 denotes a liquid crystal display panel having a function equivalent to that of the finder 24.

An optical apparatus that is compact and has a high optical performance can be realized by applying the optical system of the present invention to an optical apparatus such as a video camera as described above.

Figure 11:
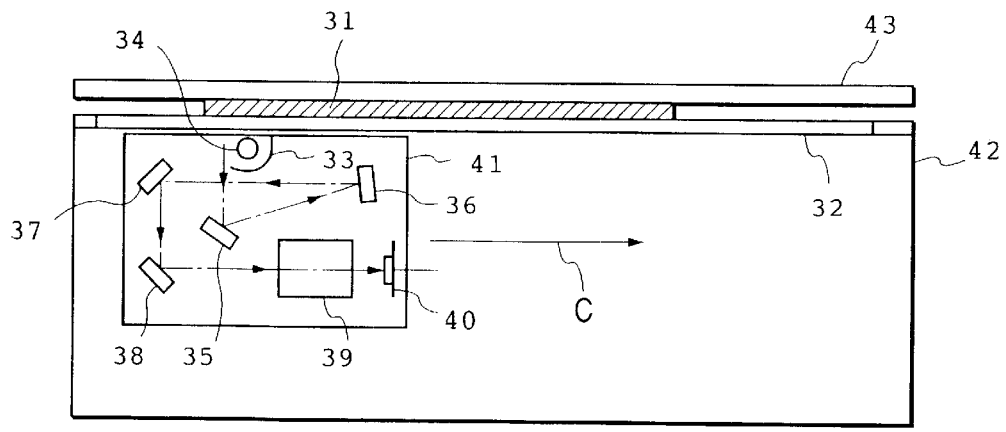
FIG. 11 is a schematic view of a main part of an original reading apparatus.
Figure 12A:
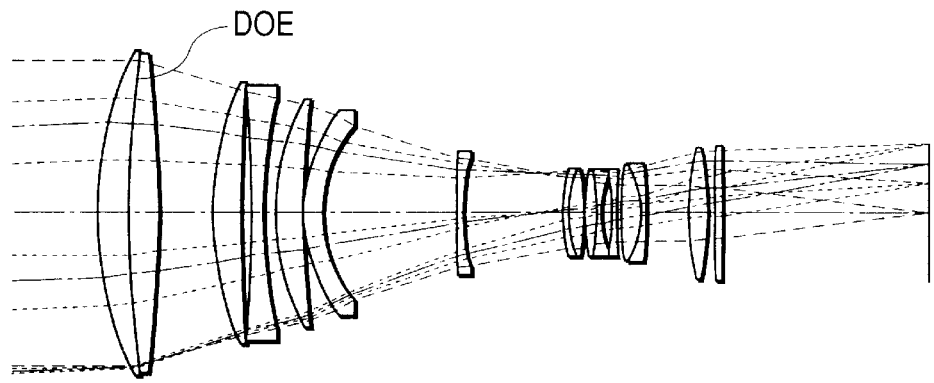
FIGS. 12A and 12B are sectional views of a conventional optical system having a diffractive optical element.
Figure 12B:
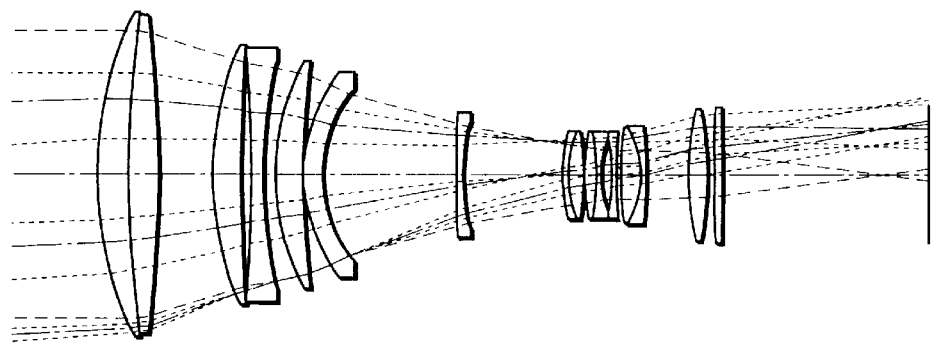
Figure 13:
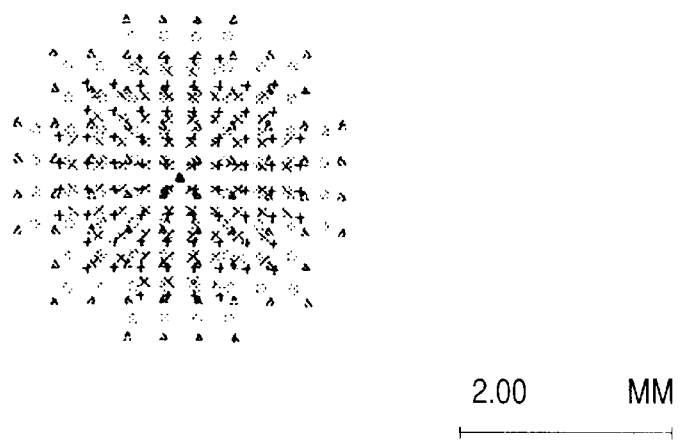
FIG. 13 is an explanatory view of a spot by the conventional optical system having a diffractive optical element.
Figure 14:
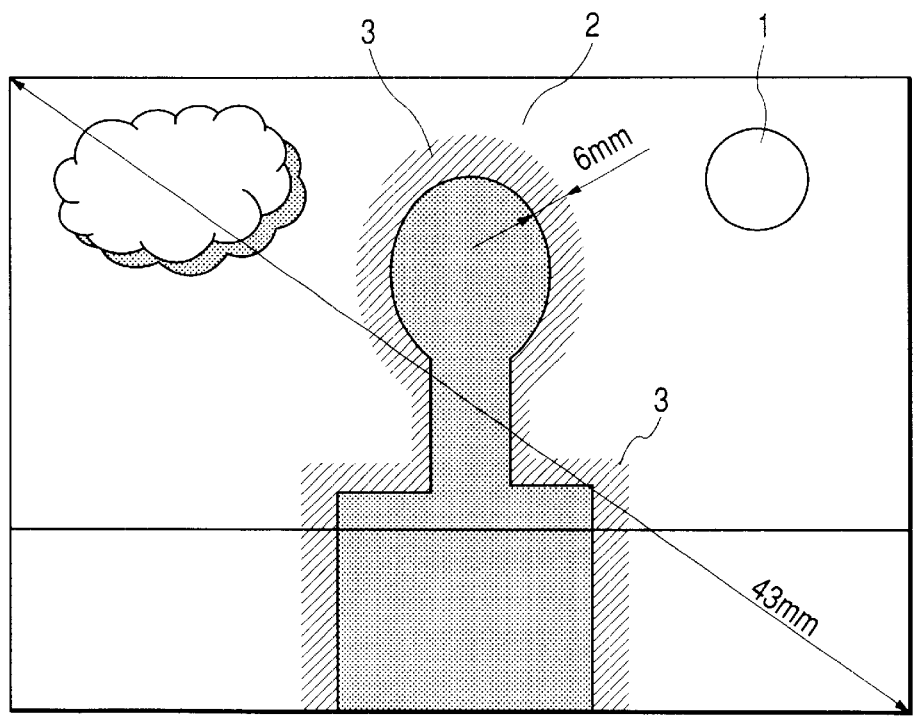
FIG. 14 is an explanatory view of an object image by the conventional optical system having a diffractive optical element.

An embodiment of an original reading apparatus such as a digital copying machine to which the optical system of the present invention is a applied as a lens for reading an original will be described next with reference to FIG. 11.

In the figure, reference numeral 32 denotes an original stand glass, on a surface of which an original 31 is placed. Reference numeral 34 denotes an illumination light source, which, for example, consists of an Xe lamp, a halogen lamp or the like. Reference numeral 33 denotes a reflector that reflects light beam from the illumination light source 34 and illuminates an original efficiently. Reference numerals 35, 36, 37 and 38 denote first, second, third and fourth reflecting mirrors, respectively, in this order, which cause an optical path of the light beam from the original 31 to be folded inside the carriage 41. Reference numeral 39 denotes a lens for reading an original in accordance with the present invention, which has the above-mentioned configuration and causes the light beam based on the image information of the original 31 to be imaged on a surface of a reading element 40. Reference numeral 40 denotes a line sensor (CCD) as a reading element. Reference numeral 41 denotes a carriage that integrally accommodates the illumination light source 34, reflector 33, the plurality of reflecting mirrors 35, 36, 37 and 38, the lens for reading an original 39, the reading element (line sensor) 40, and the like, and scans the original 31 in the sub scanning direction (in the arrow C direction in FIG. 11) by a driving apparatus (not shown) such as a sub scanning motor to read image information of the original 31. Reference numeral 42 denotes a main body. Reference numeral 43 denotes a press plate.

In this embodiment, the light beam emitted from the illumination light source 34 illuminates the original 31 directly or via the reflector 33. The optical path of the light beam reflected from the original 31 is caused to be folded inside the carriage 41 by the first, second, third and fourth reflecting mirrors 35, 36, 37 and 38 to form an image of the light beam on the surface of the CCD 40 by the lens 39. Then, the image information of the original 31 is read by causing the carriage 41 to move in the arrow C direction (sub scanning direction) by the sub scanning motor.

In addition to this embodiment, the optical system of the present invention is applicable to an optical apparatus in various fields such as optical measurement and semiconductor manufacturing.

As described above, according to this embodiment, an optical system, in which chromatic aberration of magnification of a high order is satisfactorily corrected and flare due to additional diffraction light is suppressed as minimum as possible while maintaining a high imaging performance up to peripheral part of the field angle, and an optical apparatus using the same can be realized.

In addition, an optical system, in which on-axis chromatic aberration and chromatic aberration of magnification are satisfactorily corrected and aberration is satisfactorily corrected up to peripheral part of the field angle while securing sufficiently long back focus, and an optical apparatus using the same can be realized.

Morever, an optical system, in which chromatic aberration, in particular, chromatic aberration of magnification of a high order is satisfactorily corrected and flare due to additional diffraction light is not conspicuous in spite of a wide angle of view, and an optical apparatus using the same can be realized.

As many apparently widely different embodiments of the present invention can be made without departing from the spirit and scope thereof, it is to be understood that the invention is not limited to the specific embodiments thereof except as defined in the appended claims.

What is claimed is:

1. An optical system comprising a diffractive optical element in which,
    a phase given to incident light from an optical axis toward the peripheral part in the radial direction is not reversed in an effective area and an absolute value of optical power on the optical axis is made minimum.

2. An optical system according to claim 1 further comprising an aperture stop,
    wherein said diffractive optical element is disposed ahead of said aperture stop and optical power decreases from the optical axis toward the peripheral part in the radial direction in the effective area.

3. An optical system according to claim 1 further comprising an aperture stop,
    wherein said diffractive optical element is disposed behind said aperture stop and optical power increases from the optical axis toward the peripheral part in the radial direction in the effective area.

4. An optical system according to claim 1,
    wherein, when a maximum value of an absolute value of optical power of said diffractive optical element in the effective area is $\phi$max and a minimum value of an absolute value of optical power of said diffractive optical element in the effective area is $\phi$min, a condition of ($\phi$max−$\phi$min)/($\phi$max+$\phi$min)>0.5 is satisfied.

5. An optical system according to claim 1 further comprising a plurality of lens units,
    wherein at least one of said plurality of lens units moves along the optical axis for zooming.

6. An optical system according to claim 5,
wherein said diffraction optical element is provided in a lens unit that does not move for zooming among said plurality of lens units.

7. An optical system according to claim 1 further comprising a plurality of lens units,
wherein a foremost lens unit among said plurality of lens units is of negative optical power.

8. An optical system according to claim 7,
wherein said diffractive optical element is provided in a rearmost lens unit among said plurality of lens units.

9. An optical system according to claim 7,
wherein said diffractive optical element is provided in a foremost lens unit among said plurality of lens units.

10. An optical system according to claim 1, further comprising:
a front lens part of negative optical power as a whole; and
a rear lens part of positive optical power as a whole,
wherein said rear lens part is disposed in the rear of said front lens part.

11. An optical system according to claim 10,
wherein said front lens part includes a first unit of negative optical power and a second unit of negative optical power from the front in order and said second unit moves along the optical axis for focusing, and
wherein said rear lens part includes a third unit of positive optical power, a fourth unit of negative optical power, a fifth unit of positive optical power and a sixth lens unit of negative optical power from the front in order and intervals among said units included in said rear lens part vary in zooming from a short focal length end to a long focal length end.

12. An optical apparatus comprising the optical system according to claim 1.

13. An optical apparatus according to claim 12 further comprising a photoelectric conversion element for receiving light via said optical system.

14. A diffractive optical element comprising a phase grating formed in a concentric shape,
wherein said grating has a shape such that a phase given to incident light from an optical axis toward the peripheral part in the radial direction is not reversed in an effective area and an absolute value of optical power on the optical axis is made minimum.

* * * * *

UNITED STATES PATENT AND TRADEMARK OFFICE
CERTIFICATE OF CORRECTION

PATENT NO.    : 6,496,310 B2
DATED         : December 17, 2002
INVENTOR(S)   : Makoto Fujimoto It is certified that error appears in the above-identified patent and that said Letters Patent is hereby corrected as shown below:

<u>Column 8,</u>
Lines 30 and 33, "λ is" should read -- λ0 is --

<u>Column 9,</u>
Line 43, in the Second numerical embodiment table, "d6=0.80" should read -- d6=0.60 --
Line 47, in the Second numerical embodiment table, "n1=1.57680" should read -- n7=1.57680 --

<u>Column 10,</u>
Line 63, Twentieth surface of Third numerical embodiment table, "-3.948E-08" should read -- -3.048E-08 --

<u>Column 11,</u>
Line 38, "is a applied" should read -- is applied --

Signed and Sealed this

Eighth Day of April, 2003

JAMES E. ROGAN
*Director of the United States Patent and Trademark Office*